(12) United States Patent
Miller et al.

(10) Patent No.: US 11,720,638 B2
(45) Date of Patent: Aug. 8, 2023

(54) EMBRYONIC PLANT LISTING SYSTEM

(71) Applicant: OnlineSeedSales LLC, Kalona, IA (US)

(72) Inventors: Robert Lynn Miller, Kalona, IA (US); Kari Makala Heusinkveld, Kalona, IA (US); Brock Patrick Adrian, Wellman, IA (US); Michiel Johan Henry Hekker, North Liberty, IA (US); Miguel Isidoro Santana, Cedar Rapids, IA (US)

(73) Assignee: OnlineSeedSales LLC, Kalona, IA (US)

( * ) Notice: Subject to any disclaimer, the term of this patent is extended or adjusted under 35 U.S.C. 154(b) by 565 days.

(21) Appl. No.: 16/426,004

(22) Filed: May 30, 2019

(65) Prior Publication Data
US 2020/0380034 A1 Dec. 3, 2020

(51) Int. Cl.
*G06F 16/909* (2019.01)
*G06F 16/9035* (2019.01)
*G06Q 50/02* (2012.01)
*G06F 3/0482* (2013.01)
*G06F 3/04845* (2022.01)
*G06F 16/9038* (2019.01)

(52) U.S. Cl.
CPC .......... *G06F 16/909* (2019.01); *G06F 3/0482* (2013.01); *G06F 3/04845* (2013.01); *G06F 16/9035* (2019.01); *G06F 16/9038* (2019.01); *G06Q 50/02* (2013.01)

(58) Field of Classification Search
CPC .............................. G06F 16/909; G06Q 50/02
See application file for complete search history.

(56) References Cited

U.S. PATENT DOCUMENTS

| | | | | |
|---|---|---|---|---|
| 8,458,054 B1* | 6/2013 | Thakur | ............... | G06Q 30/0603 705/27.1 |
| 2001/0032165 A1* | 10/2001 | Friend | .................... | G06Q 40/04 705/37 |
| 2002/0049667 A1* | 4/2002 | Navani | .................. | G06Q 10/06 705/26.1 |
| 2002/0120510 A1* | 8/2002 | Kawakami | ......... | G06Q 30/0207 705/14.1 |
| 2002/0128926 A1* | 9/2002 | Ohm | .................. | G06Q 30/0633 705/26.8 |
| 2003/0154142 A1* | 8/2003 | Ginsburg | ........... | G06Q 30/0273 705/28 |

(Continued)

OTHER PUBLICATIONS

"International Application Serial No. PCT US2020 035288, International Search Report dated Aug. 14, 2020", 2 pgs.

(Continued)

*Primary Examiner* — William Spieler
(74) *Attorney, Agent, or Firm* — Schwegman Lundberg & Woessner, P.A.

(57) ABSTRACT

A network platform for managing agricultural display content (e.g., seed listings) can be implemented to enable posting users to create complex listings that have static data, variable data, and geographic data associated with each listing. One or more map user interfaces have different viewing levels to specify network site visibility for each listing at different viewing levels (e.g., region level, subregion level).

20 Claims, 19 Drawing Sheets

(56) References Cited

U.S. PATENT DOCUMENTS

| | | | | |
|---|---|---|---|---|
| 2004/0158488 A1* | 8/2004 | Johnson | | G06Q 30/02 |
| | | | | 705/14.66 |
| 2004/0199398 A1* | 10/2004 | Kubota | | G08G 1/207 |
| | | | | 705/7.34 |
| 2006/0206413 A1* | 9/2006 | Van Luchene | | G06Q 40/04 |
| | | | | 705/37 |
| 2006/0224327 A1* | 10/2006 | Dunlap | | G06Q 30/02 |
| | | | | 702/19 |
| 2008/0091539 A1* | 4/2008 | Ruckart | | G06Q 30/0239 |
| | | | | 705/14.39 |
| 2008/0162306 A1* | 7/2008 | Mahaffey | | G06Q 10/02 |
| | | | | 705/26.1 |
| 2008/0313039 A1* | 12/2008 | Altberg | | G06Q 30/0251 |
| | | | | 705/14.54 |
| 2009/0012865 A1* | 1/2009 | Celik | | G06F 16/29 |
| | | | | 705/28 |
| 2009/0049097 A1* | 2/2009 | Nocifera | | H04L 65/611 |
| | | | | 709/224 |
| 2011/0271404 A1 | 11/2011 | Hatzfeld et al. | | |
| 2011/0295575 A1 | 12/2011 | Levine et al. | | |
| 2012/0272185 A1* | 10/2012 | Dodson | | H04N 21/44204 |
| | | | | 715/810 |
| 2013/0018957 A1* | 1/2013 | Parnaby | | G06Q 30/0203 |
| | | | | 709/204 |
| 2013/0298287 A1 | 11/2013 | Park et al. | | |
| 2015/0033412 A1 | 1/2015 | Lee et al. | | |
| 2019/0066167 A1* | 2/2019 | Warrum | | G06Q 30/0249 |

OTHER PUBLICATIONS

"International Application Serial No. PCT US2020 035288, Written Opinion dated Aug. 14, 2020", 5 pgs.

* cited by examiner

| | | | | | | |
|---|---|---|---|---|---|---|
| LOCATION | RILEY COUNTY, KS | | | SEED SITE | | |
| CORN ▼ | RESULTS: | | | | | |
| VARIABLES | VARIETY | BRAND | INSECT TRAITS | SEED PRICE | | |
| DROUGHTY SOILS<br>0 — 5 | M93-85BD | MILLER | ABOVE GROUND | $193.00 | ADD | 1420A |
| WET SOILS<br>0 — 5 | RX095D | ROCK | ABOVE/BELOW | $119.37 | ADD | 1420B |
| POP 27-31<br>0 — 5 | R515DA | ROSHE | ABOVE GROUND | $247.54 | ADD | 1420C |
| FUNGICIDE SENSITIVITY<br>0 — 5 | S4D1 | SMITH | BELOW GROUND | $133.54 | ADD | 1420D |
| | SAT545 | SATURN | NONE | $75.54 | ADD | 1420E |

*FIG. 14*

EMBRYONIC PLANT LISTING SYSTEM

TECHNICAL FIELD

Embodiments of the present disclosure relate generally to Internet messages and, more particularly, but not by way of limitation, to managing data on a network site.

BACKGROUND

Users can publish content on network sites for other users to browse. If the data is simple, such as a collection of images, publishing the content to a network site can be a relatively straightforward process. However, some content, such as listings for agricultural products, are difficult to publish online due to the high number of parameters (e.g., traits, soil attributes, etc.) for each type of agricultural product. Further, each parameter for each listing may change rapidly due to different dynamic events, such as weather systems, and managing each listing for each item quickly becomes impractical.

BRIEF DESCRIPTION OF THE DRAWINGS

Various ones of the appended drawings merely illustrate example embodiments of the present disclosure and should not be considered as limiting its scope.

FIG. 14 shows a browsing user interface, according to some example embodiments.

DETAILED DESCRIPTION

Figure 1:
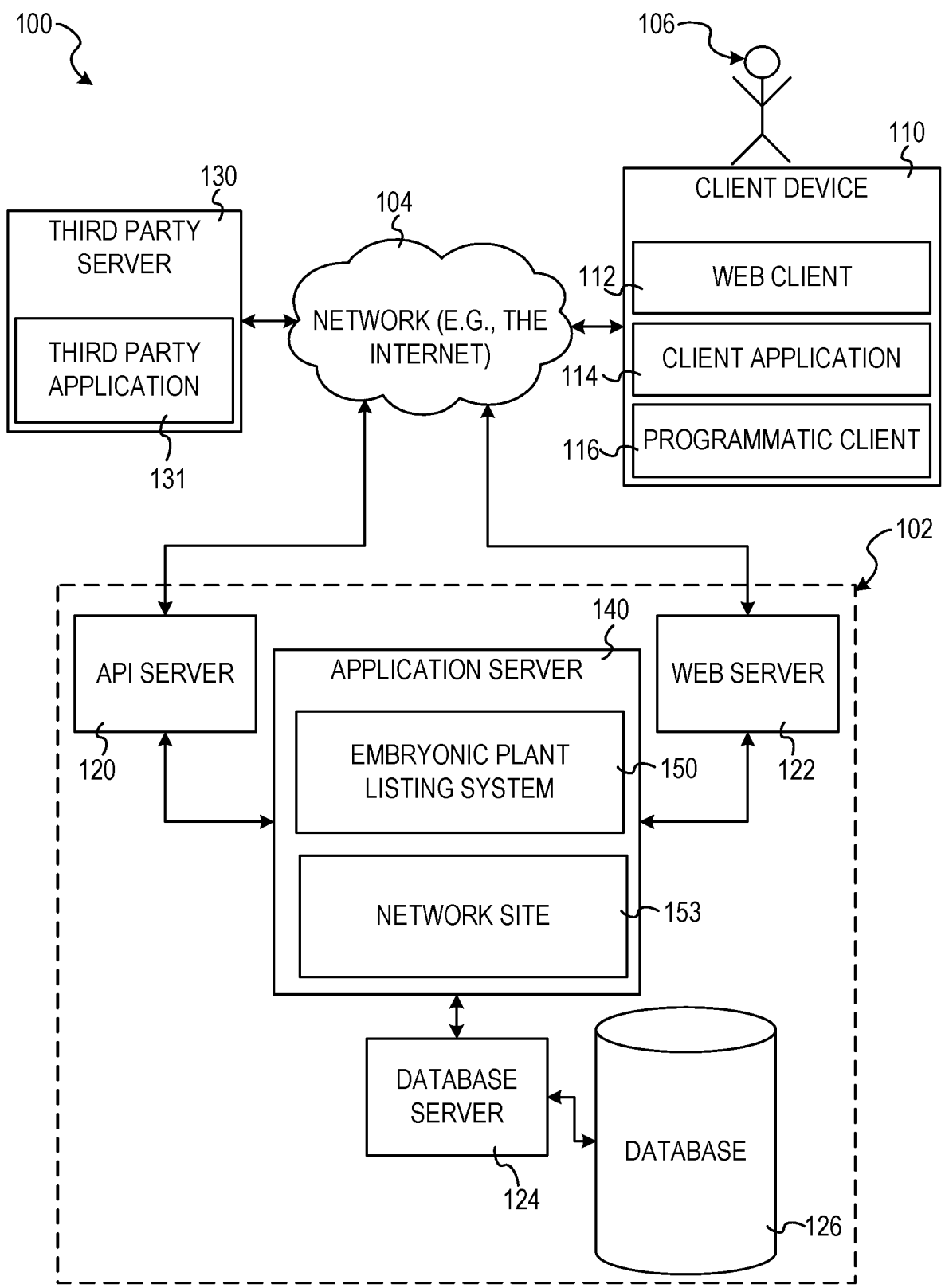
FIG. 1 is a block diagram illustrating listing system implemented in a networked environment, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned, some content, such as agricultural listings for plant seeds, can be difficult for end-users (e.g., a seed distributor) to post on network sites (e.g., a website for seed listings). Agricultural listings such as seed listings are complex due to the high number of parameters (e.g., traits, soil attributes, pest repellent characteristics, growing characteristics, etc) that can change based on where a given plant is to be grown (e.g., which county, which state, which country). Further, once a listing is published to a network site, additional events (e.g., local weather, national weather, water conditions, regional laws, distributor agreements, manufacturer royalty rates), can change on a day to day basis, and change differently in different localities (e.g., counties). As is evident, managing each agricultural listing for each agricultural item in. response to changed conditions in each locality is complex and resource intensive.

To this end, an embryonic plant listing system can be implemented to enable end users (e.g., a seed distributor, a posting user) to create agricultural item listings that can manage how the listing appears as a search result based on where a searching/browsing users is viewing the listing. In some example embodiments, the embryonic plant listing system comprises a post user interface that enables a posting user to specify static attributes (e.g., seed type, traits, description), variable data (e.g., data on a range spectrum, such as pH levels, soil characteristics), and geographic data for a given listing in an approach that is easy to implement and manages after the item listing is created. In some example embodiments, where a given agricultural item listing is display-able as a search result is specified in a map user interface at one or more selection resolutions (e.g., a state selection level, a county selection level), and listing data for each selected area can be specified directly through popup windows or be autocompleted based on pre-entered values. Other end users that are browsing or searching on a network site equipped with the embryonic listing platform, input their geographic location data (e.g., county), and one or item listings are automatically displayed to the end-users. This approach thereby enables posting users to funnel browsing users in different geographic areas to different results pages, based on where the browsing users are located.

With reference to FIG. 1, an example embodiment of high-level client-server-based network architecture 100 is shown. A networked system 102, in the example forms of a network-based listing system, provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), applications 114, and a programmatic client 116 executing on the client device 110. The client device 110 includes the web client 112, the client application(s) 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultra-book, netbook, laptop, desktop, multi-processor system, microprocessor-based or programmable consumer electronic, game consoles, set-top box, network, Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via. a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMAX) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps (also referred to as "apps"). In some implementations, the client application(s) 114 include various components operable to present information to the user and communicate with networked system 102. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

The web client 112 accesses the various systems of the networked system 102 via the web interface supported by a web server 122. Similarly, the programmatic client 116 and client application(s) 114 accesses the various services and functions provided by the networked system 102 via the programmatic interface provided by an Application Program Interface (API) server 120. The programmatic client 116 can, for example, be a seller application to enable sellers to author and manage listings on the networked system 102 in an off-line manner, and to perform batch-mode communications between the programmatic client 116 and the networked system 102.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application server(s) 140. The application server(s) 140 may host a network site 153 and an embryonic plant listing system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., inventory, image data, catalog data) to the listing network platform 142. The database(s) 126 also stores digital good information in accordance with some example embodiments. Additionally, a third party application 131 is illustrated executing on third party server(s) 130. The third-party application 131 can programmatically access the networked system 102 via the programmatic interface provided by the API server 120.

The network site 153 provides a number of publication functions and listing services to the users that access the networked system 102 (e.g., the network site 153 manages a website upon which listings are accessible). While the network site 153 is shown in FIG. 1 to both form part of the networked system 102, it will be appreciated that, in alternative embodiments, the network site 153 may form part of a web service that is separate and distinct from the networked system 102.

While the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server(s) 140 (e.g., embryonic plant listing system 150) may also be implemented as standalone software programs, which do not necessarily have networking capabilities.

The listing network platform 142 can be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components access one or more database(s) 126 via the database server(s) 124. The listing network platform 142 provides a number of publishing, listing, and listing mechanisms whereby a seller (also referred to as a "first user") may list (or publish information concerning) goods or services for sale or barter, a buyer (also referred to as a "second user") can express interest in or indicate a desire to purchase or barter such goods or services, and a transaction (such as a trade) may be completed pertaining to the goods or services.

Figure 2:
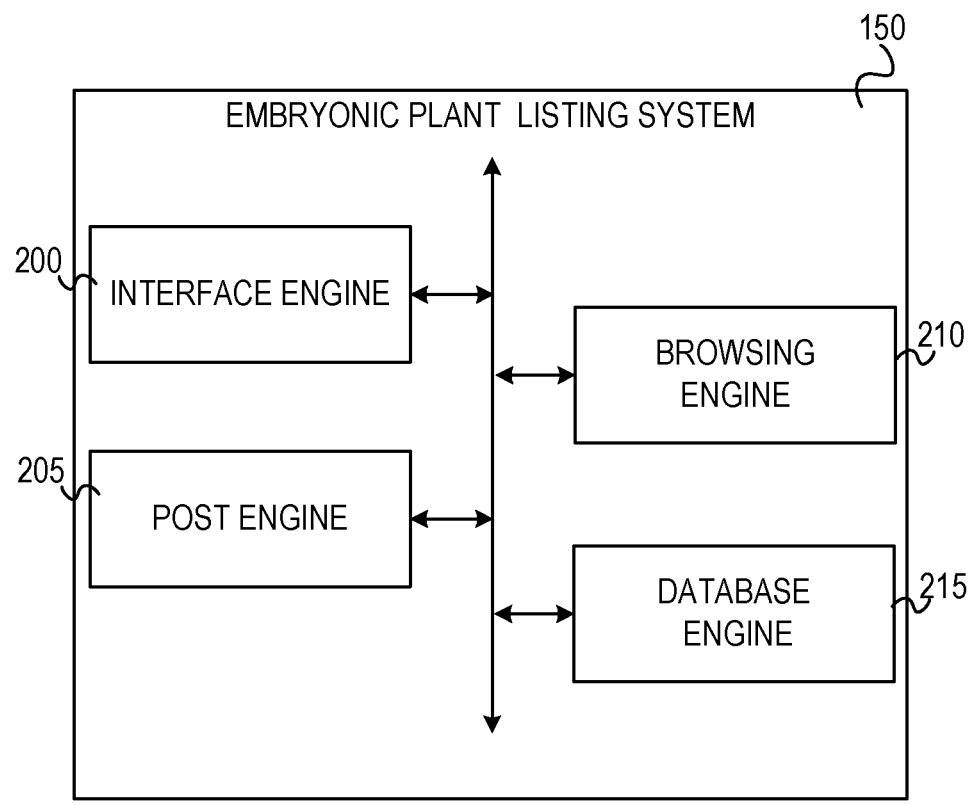
FIG. 2 shows example functional engines of an embryonic plant listing system, according to some example embodiments.

FIG. 2 shows example functional engines of an embryonic plant listing system 150, according to some example embodiments. As illustrated, embryonic plant listing system 150 comprises an interface engine 200, a post engine 205, the browsing engine 210, and the database engine 215. The interface engine 200 manages receiving user input data. The posting engine 205 is configured to construct agricultural item listings from listing data input through one or more user interfaces (e.g., static, variable, and map user interfaces). The browsing engine 210 manages receiving search or browsing requests for item listings. The database engine 215 manages storing the item listings generated through the post engine 205, according to some example embodiments.

Figure 3:
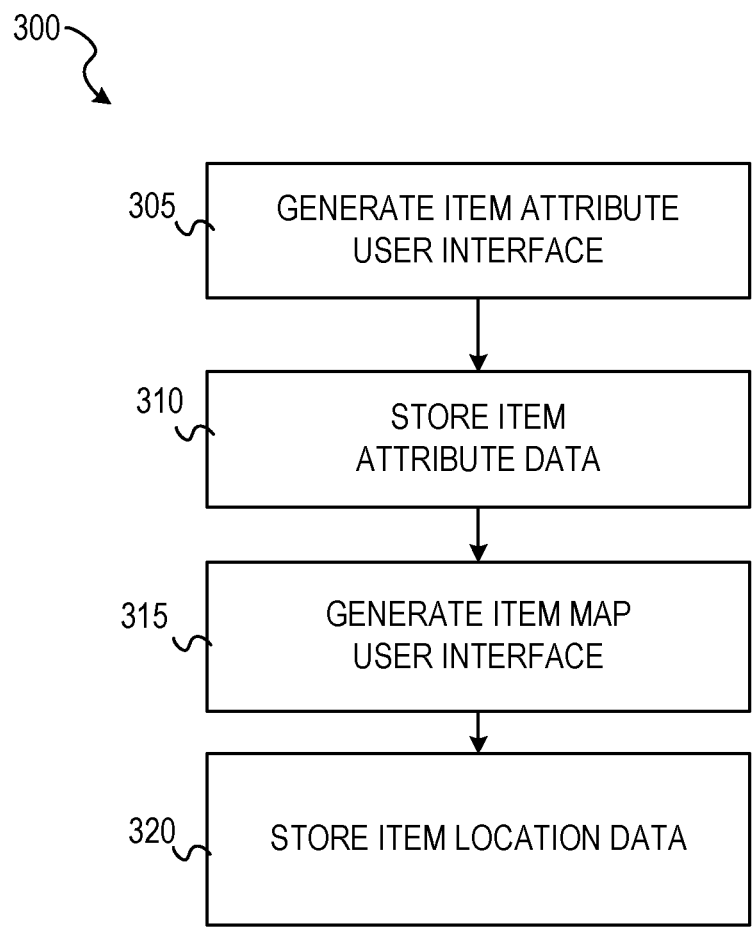
FIG. 3 shows a flow diagram of an example method for generating a geo-based item listing, according to some example embodiments.

FIG. 3 shows a flow diagram of an example method 300 for generating a geo-based item listing, according to some example embodiments. At operation 305, the post engine 205 generates an item attribute user interface. The item attribute interface includes fields to input data for a listing, including static and variable field data, according to some example embodiments. At operation 310, the post engine stores item attribute data received through the item attribute user interface generated at operation 305. At operation 315, the post engine 205 generates an item map user interface. The item map user interface can include an image of geographic area in which different agricultural items (e.g., seeds, plants, fertilizer) can be used (e.g., farmed, distributed, processed). At operation 320, the post engine 205 stores item location data received through the item map user interface generated at operation 315.

Figure 4:
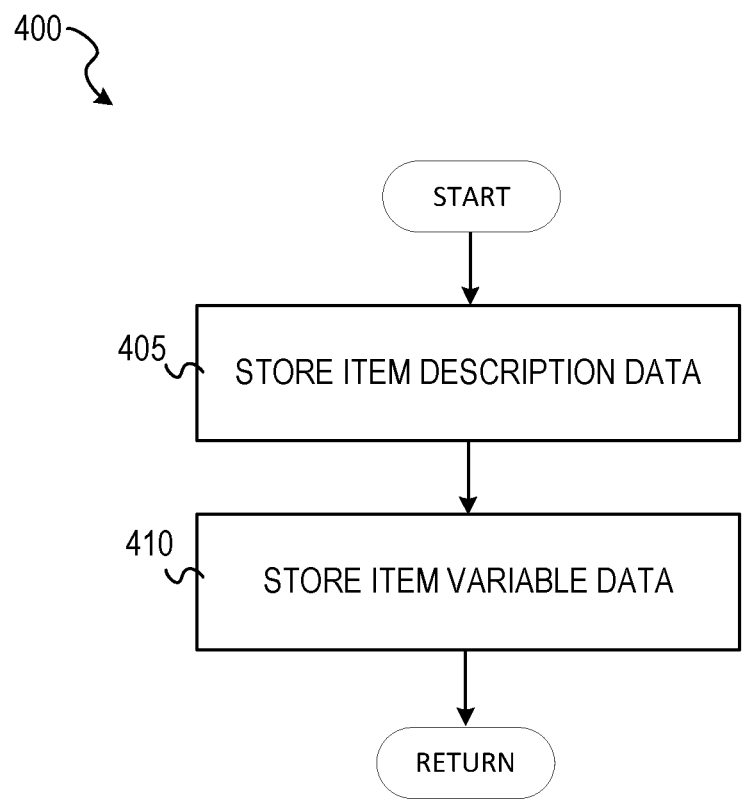
FIG. 4 shows a flow diagram of an example method for managing item attribute data or a geo-based item listing, according to some example embodiments.

FIG. 4 shows a flow diagram of an example method 400 for managing item attribute data or a geo-based item listing, according to some example embodiments. Example method 400 is implemented as a subroutine of operation 310 in FIG. 3, in which item attribute data input into the item attribute user interface is stored as part of a geo-based item listing, according to some example embodiments. As illustrated, the example method 400 initiates with a start bar and terminates or ends with a return bar that terminates the subroutine function and returns data to the method 300 for further processing. At operation 405, the post engine 205 stores item description data. The item description data is data that describes an agricultural item's attributes that are static in nature, such as the plant type, traits, harvest data, etc. Further detailed examples of item description data are discussed below with reference to FIG. 8 and FIG. 14.

At operation 410, the post engine 205 stores item variable data. The variable data is agricultural data that can vary over a range, such as soil wetness, acceptable pH levels, etc. Further detailed examples of item variable data are discussed below with reference to FIG. 9 and FIG. 14. In some example embodiments, after operation 405 and operation 410 the method 400 terminates and returns or stores data for further processing (e.g., in method 300).

Figure 5:
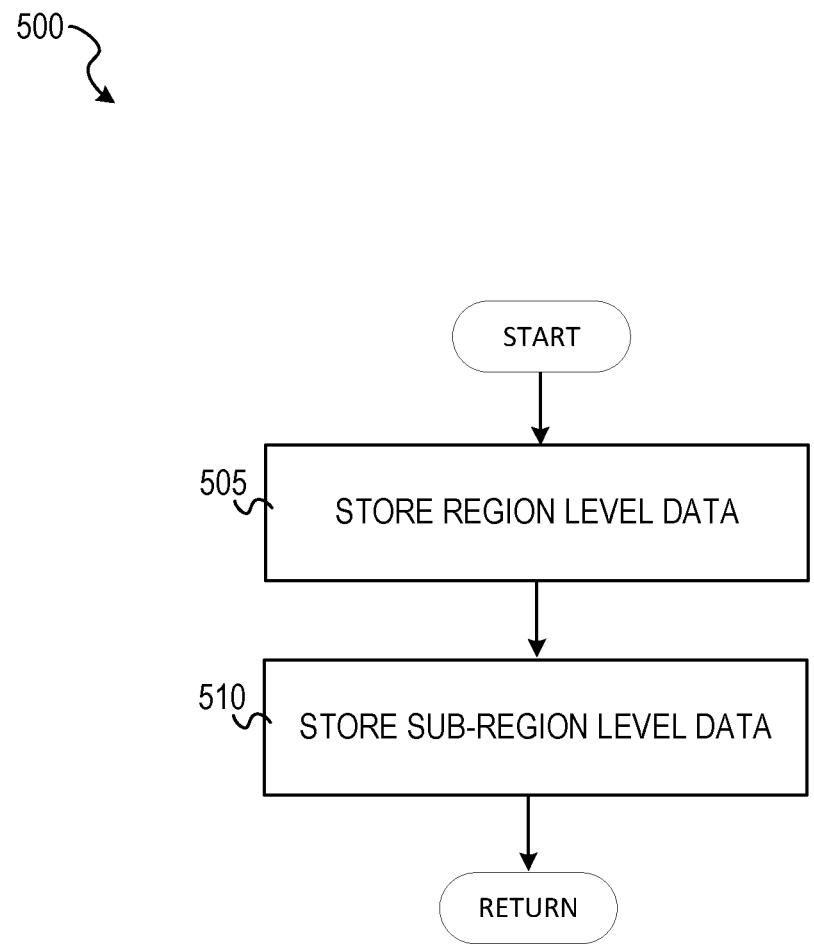
FIG. 5 shows a flow diagram of an example method for managing geographic location data for a geo-based item listing, according to some example embodiments.

FIG. 5 shows a flow diagram of an example method 500 for managing geographic location data for a geo-based item listing, according to some example embodiments. Example method 500 is implemented as a subroutine of operation 320 in FIG. 3, in which item location data that is input into the item map user interface is stored as part of a geo-based item listing, according to some example embodiments. As illustrated, the example method 500 initiates a start bar and terminates or ends with a return bar that terminates the subroutine function and returns data to the method 300. At operation 505, the post engine 205 stores region level data input into the item map user interface through one or more user interaction types. For example, at operation 505 the posting engine 205 receives selections from a posting user of one or more stage regions in a map of the United States. At operation 510, the post engine 205 stores sub-region level data that is input into the item map user interface through one or more user interaction types. For example, at operation 505, the posting engine 205 receives selections from a posting user in one or more counties in a given state. In some example methods, in order to efficiently specify regions and sub-regions for a given agricultural item listing, the post engine 205 is configured with selection and deselection alternative user input actions that function the same at the region and sub-region viewing levels, as discussed further with reference to FIGS. 6A-6C.

Figure 6A:
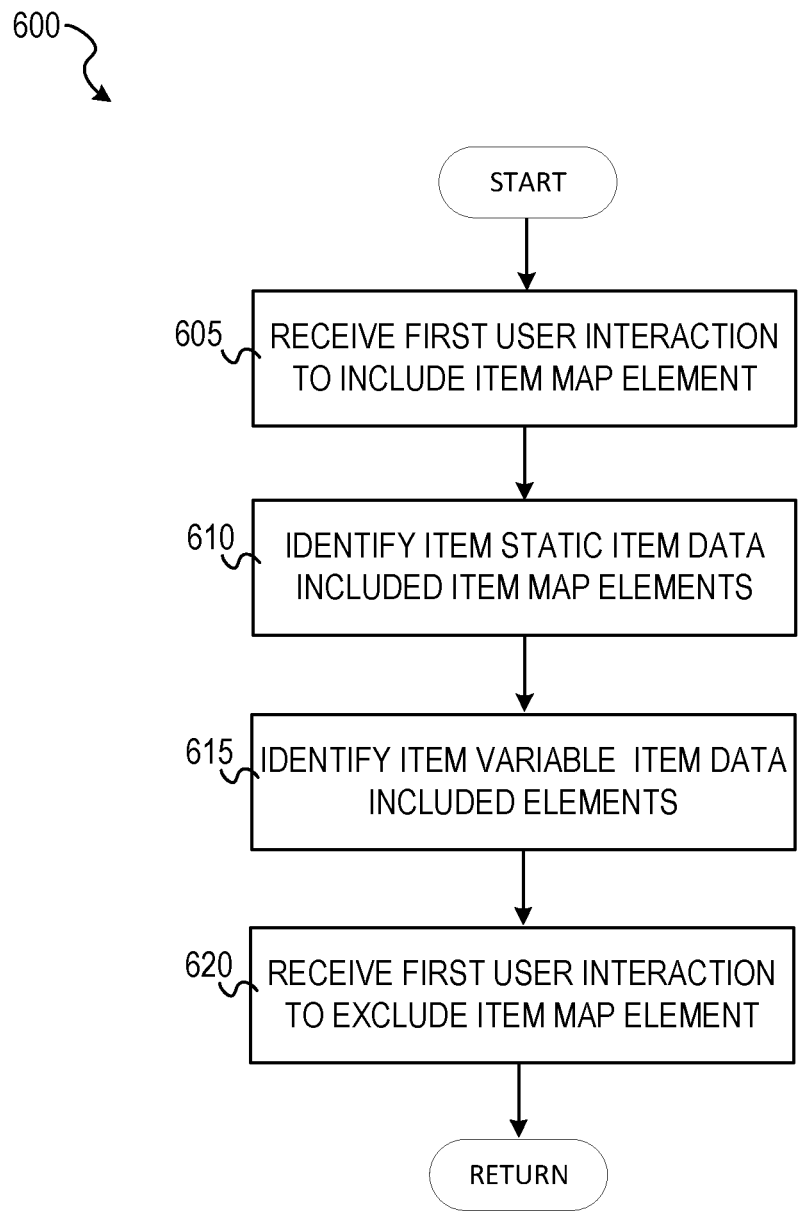
FIGS. 6A-6C shows an example method for managing region level data and sub-region level data, according to some example embodiments.
Figure 6B:
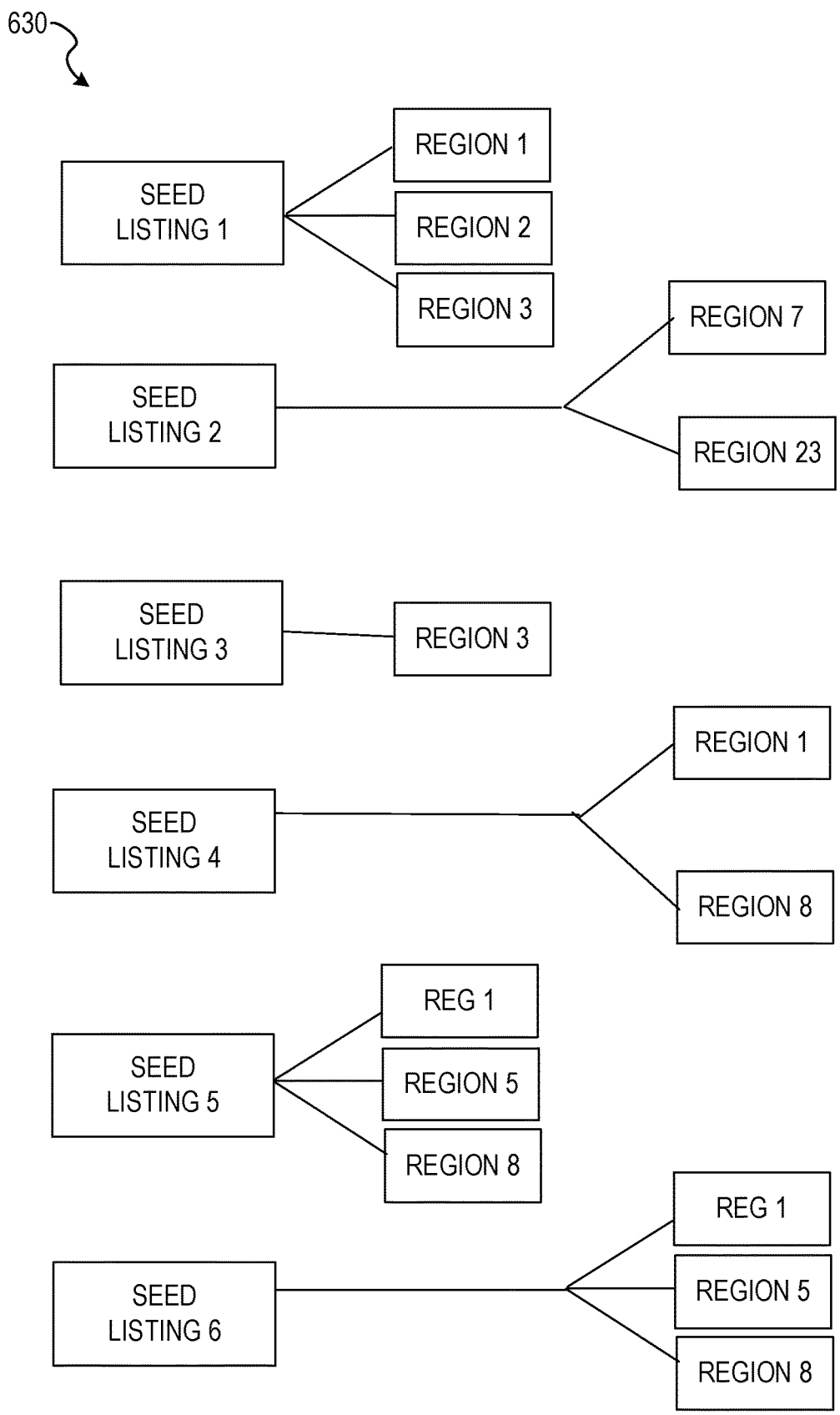

FIG. 6A shows an example method 600 for managing region level data and sub-region level data, according to some example embodiments. The method 600 can be implemented as both a subroutine of operation 510 (in which region level data stored) and operation 515 (which sub engine level data stored), according to some example embodiments. As illustrated, the example in 600 initiates with the start bar and terminates or ends with the return bar that terminates a subroutine function returns the data to the method 500, and in turn to method 300 (where method 500 is a subroutine of method 300). As discussed, due to the dynamic nature of agricultural products, placement of agricultural items listings can vary quickly and posting users must practically respond to agricultural changes in each of their item listings quickly. Method 600 enables a posting user to select a given region or subregion using the same alternative interactions (e.g., control clicking, or short cut keys) without opening additional windows or filling out forms through use of selection and de-selection user inputs on a zoomable map, where the user selection and de-selection user interactions operate the same at different zoom levels (e.g., region level or sub-region level).

At operation 605, the interface engine 200 receives a first user interaction to include an item map element, such as a region or sub-region. For example, at a state zoom level of map item user interface, a posting user can control click (e.g., pressing the control button while tapping or clicking) on a state to include the state. At operation 610, the post engine 205 identifies static item data to associate with the included map element. In some example embodiments, the static data (e.g., pricing data, shipping data, item data) is input on a previous user interface, such as the item description user interface of operation 405. In these embodiments, upon control clicking the state, the item listing is includable as a search result listing for users searching from that state, and the static data is pre-filled in via the previous user interface. In some example embodiments, upon control clicking the state at the state zoom level, one or more pop up windows may be displayed to optionally let the posting user specify static data for the newly included region.

At operation 615, the post engine 205 identifies variable item data to associate with the included item map element. In some example embodiments, the variable item data (e.g., soil data, pH level data) is input on a previous user interface, such as the item variable user interface of operation 410. In these embodiments, upon control clicking the state, the item listing is includable as a search result listing for users searching from that state, and the variable data is pre-filled in via the previous user interface. In some example embodiments, upon control clicking the state at the state zoom level, one or more popup windows with input fields may be displayed to optionally enable the posting user input or edit variable data for the newly included region.

At operation 620, the interface engine 200 receives a second user interaction to exclude another item map element. For example, the interface engine 200 receives a shift click (e.g., selecting the shift button while clicking or tapping) on a state to exclude the listing as a search result for users in that state.

Though the example of FIG. 6A involves the region level (e.g., states), it is appreciated that the method 600 is reconfigurable (e.g., omitting operation 620. Further, the method 600 can be implemented at the state level, and then the subregion level using the same selection and de-selection processes. The method 600 can be performed multiple times for each selected region or sub-region, for a given listing to create an item listings structure 620 as displayed in FIG. 6B. In the item listings data structure 630, the item listings are seed listings. Each seed listing is associated with one or more regions for which the listing can be displayed as search results. For example, seed listing 1 is includable as a search result for regions 1-3, where seed listing 3 is includable as search result only for region 3, where the inclusions are performed via control clicking at the region level (e.g., state level). The posting user can zoom in further specify data as displayed in FIG. 6C.

Figure 6C:
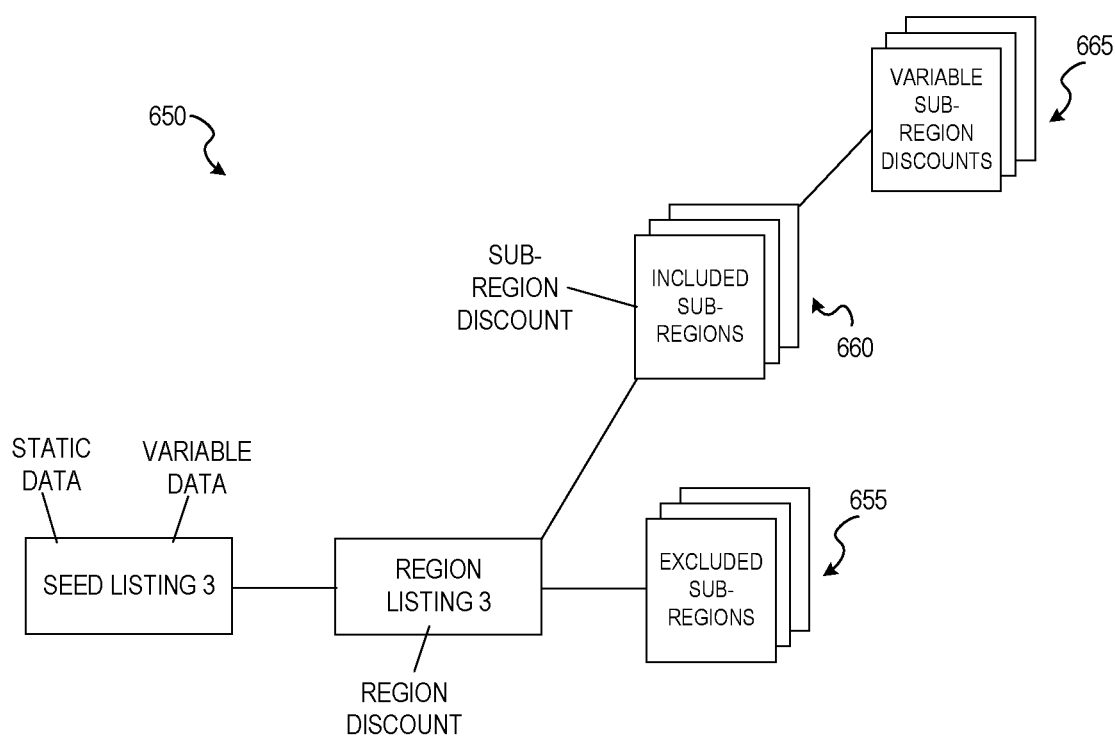

As illustrated in expanded data structure 650 in FIG. 6C, the posting user at the state level included region 3, and further specified a default discount "Region Discount" tag in for seed listing 3 (e.g., 10% of ground resistant hybrid corn for Kansas) in that region. The posting user then zooms in to the sub-region or county level in the item map user interface, and shift clicks one or more counties to store those as excluded. subregions 655 for which seed listing 3 is not includable as a search result. Further, the posting user then control clicks a number of regions 660 to include them (if not already included by the state include instruction at the state level), which may further be auto tagged from previously entered static item data (as displayed by the "sub-region discount" tag). In some example embodiments, the posting user further adds variable discount region data 665 to specify the discount for each region via a pop-up window. The variable discount region data may be reflected on the map via different hues or intensity of the same color (e.g., deep blue for 90% discount, light white blue for 5% discount). Upon selecting a store user interface commend, the structure 630 and 650 is stored with seed listing 3, which is displayable as a webpage or user interface page (e.g., user interface of a mobile application or "app").

Figure 7:
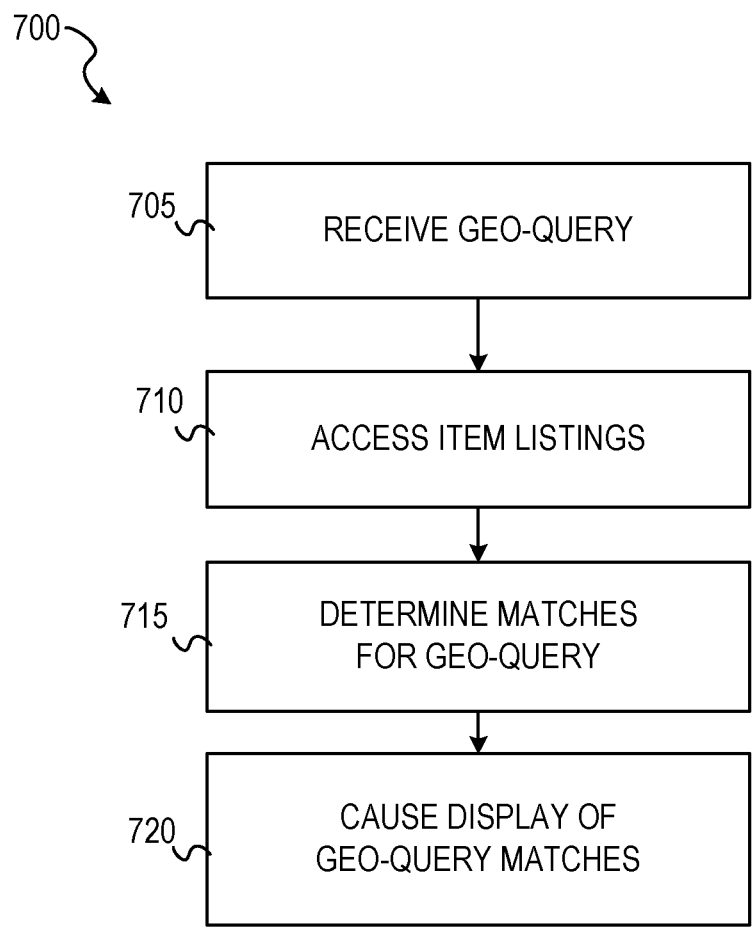
FIG. 7 shows a flow diagram of a method for passive network site navigation for item listings, according to some example embodiments.

FIG. 7 shows a flow diagram of a method 700 for passive network site navigation for item listings, according to some example embodiments. At operation 705, the browsing engine 210 receives a geo-based agricultural item query. For example, the browsing engine 210 receives, from a farmer end-user, a zip code and plant type for which the farm is searching via network site 153 (FIG. 1). At operation 710, the database engine 215 accesses the item listings generated via methods 300, 400, 500, and 600, as discussed above. At operation 715, the database engine 215 determines matches for the geo-based query using the structures for each of the listings (e.g., data structures 630 and 650). At operation 720, the browsing engine 210 causes a display of geo-based query matches to the searching user, as discussed in further detail below with reference to FIG. 14.

Figure 8:
FIG. 8 shows an item attribute user interface, according to some example embodiments.

FIG. 8 shows an item attribute user interface 800, according to some example embodiments. In FIG. 8, the posting user (e.g. a seed distributor, manufacture, etc.) inputs static item data of an item listing (e.g. corn item listing) into the static item data window 805. FIG. 8 further displays a link 803 of the item map user interface in the selected input geographic location data as discussed in FIGS. 10-14. Further, FIG. 8 displays a post button 815 that the post user can select to submit the listing to the database 126.

Figure 9:
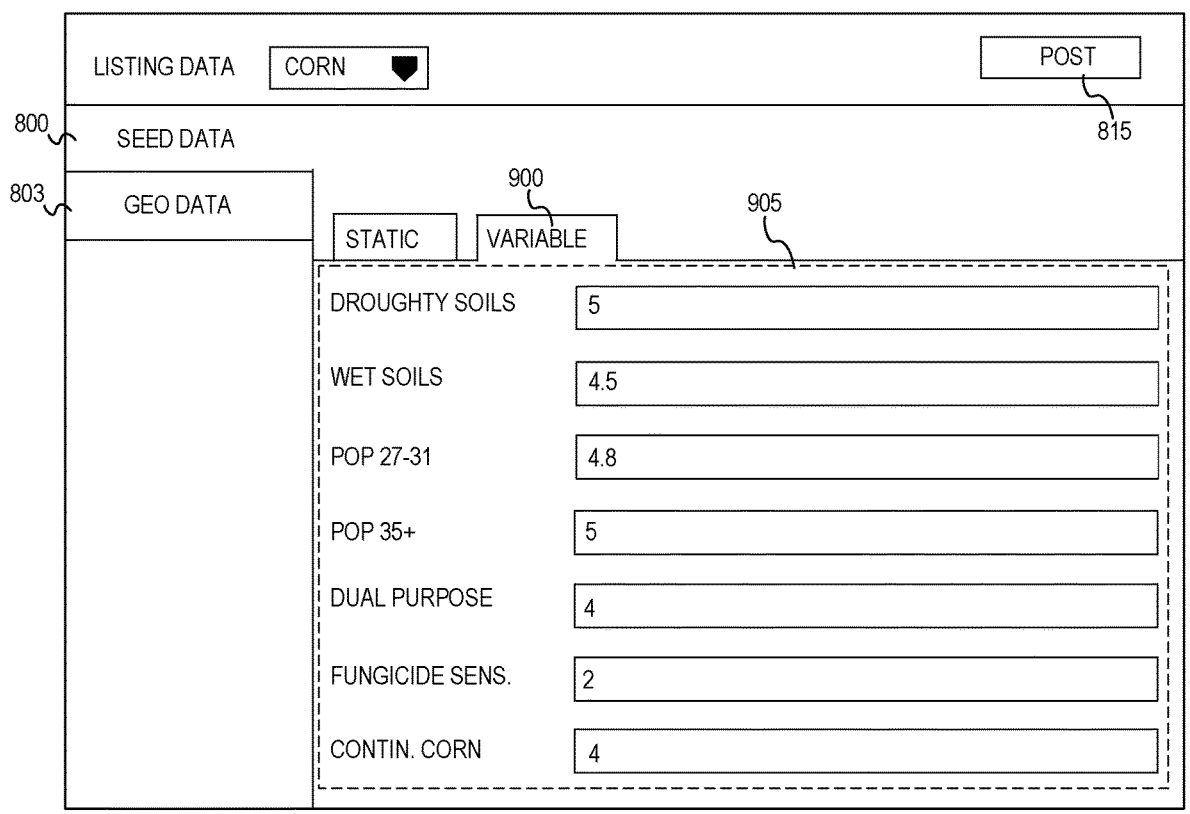
FIG. 9 displays an item variable data user interface for managing variable item data, according to some example embodiments.

FIG. 9 displays an item variable data user interface for managing variable item data, according to some example embodiments. In FIG. 9, user has selected the variable item data tab 900 input variable item data 905 to the input fields. In some example embodiments, the data input through the user interfaces of FIGS. 8 and 9 are then associated with a seed listing item. For example, with reference to FIG. 6C, static data and variable data received form the posting user is stored with seed listing 3 (e.g., stored as metadata or referenced by seed listing 3).

Figure 10A:
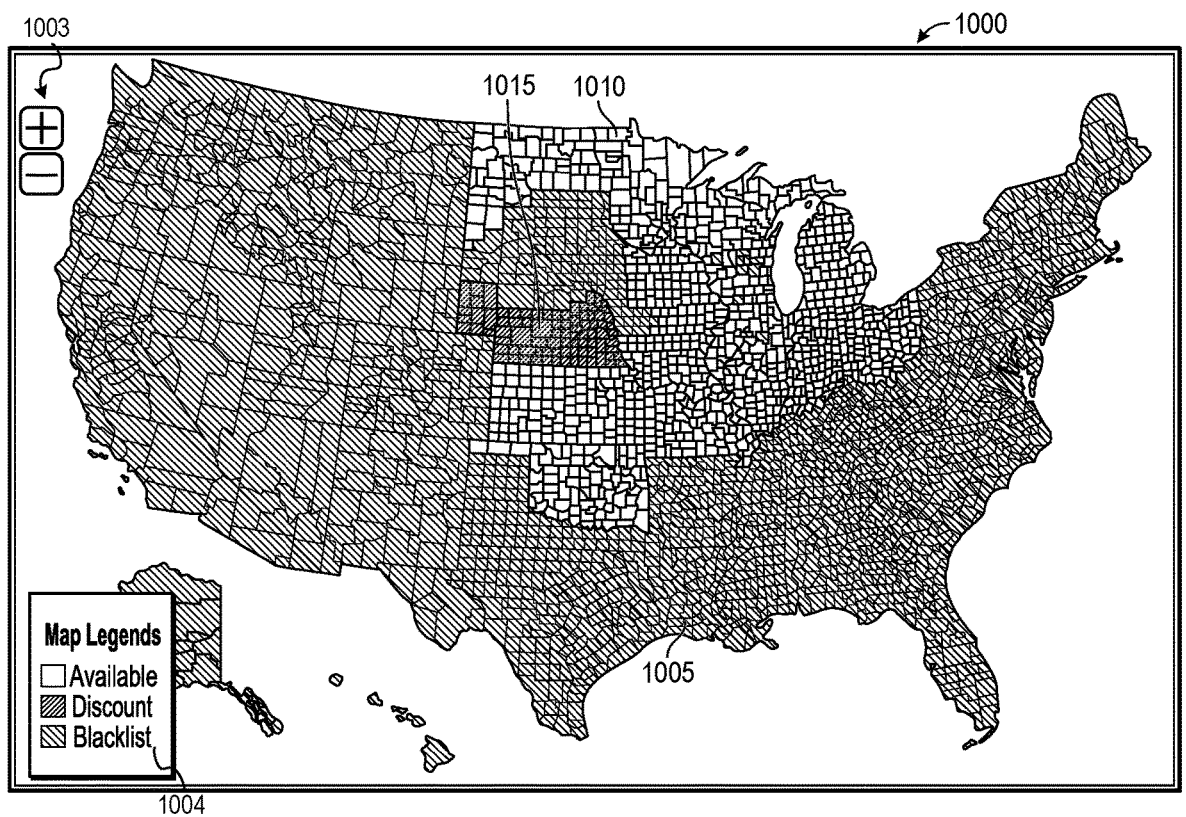
FIGS. 10A and 10B show item map user interfaces, according to some example embodiments.

FIG. 10A shows an item map user interface 1000, according to some example embodiments. Item map user interface 1000 can be displayed in response to the posting user selecting link 803 (displayed in FIG. 8 and FIG. 9). In the example of FIG. 10, the item map user interface 1000 displays a map of the United States with selectable regions and subregions. The following examples, the regions are states and the subregions or counties within respective states. The embodiment FIG. 10, the item map user interface is displayed at the region level in which the posting user can select or deselect entire states to be included for the item listing. That is, the posting user can specify at the state level. which states the item listing can be returned or displayed as a search result for users in the enabled states. The different regions can be excluded locations 1005, included locations 1010, and included variable discounted locations 1015. Each of the different region types can be visually differentiated in the user interface using line patterns as indicated in the map legend 1004. In some example embodiments, the different region types are displayed using different colors or different hues or intensities of colors instead of line patterns.

Users searching from the excluded locations 1005 (e.g. a user in Arizona which is in the excluded regions 1005 data set) will not see the item listing as a search result. In contrast, users searching from the included locations 1010 (e.g., a user in North Dakota) will see the item listing as a search result. Further, users searching in the included variable discounted locations 1015 will see the item listing as a search result and further be automatically displayed a discounted price based on the region being in the included variable discounted locations 1015 regions.

Figure 10B:
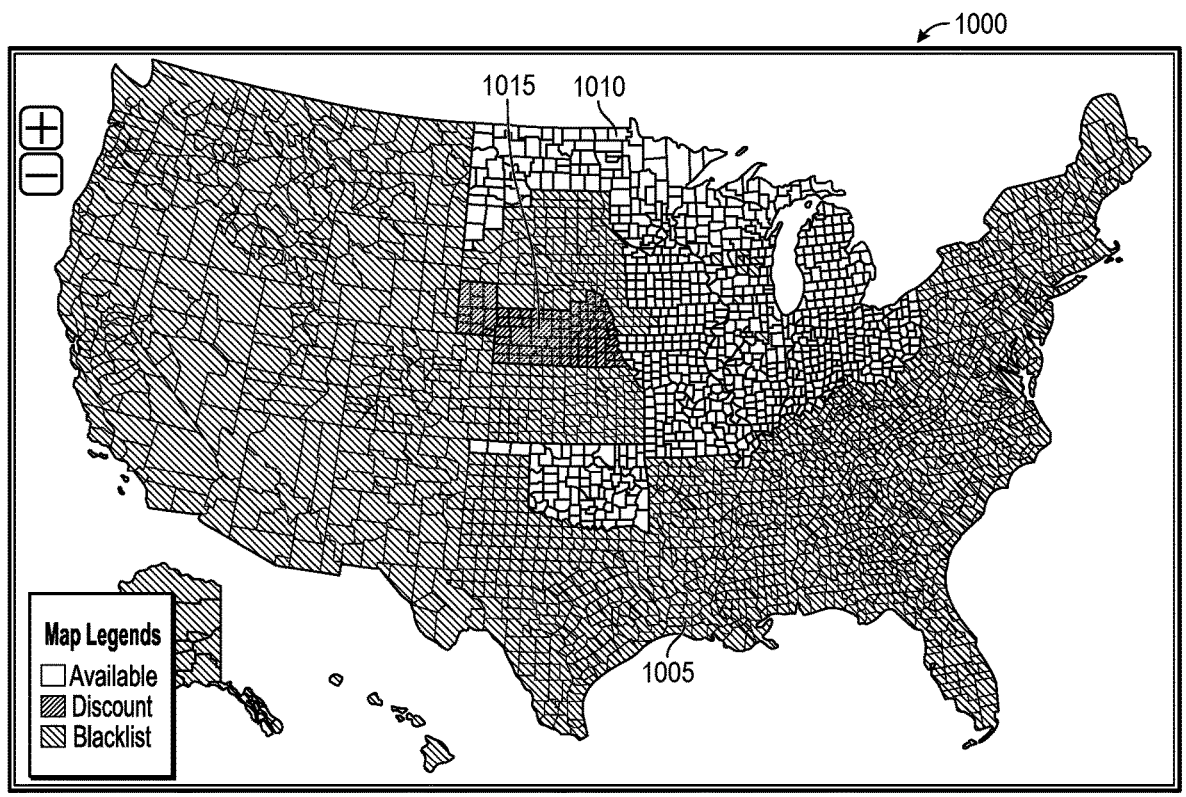

In some example embodiments, to include a state region for a given item listing, the posting user performs a first type of user input interaction, such as mouse-clicking on the state while holding down the control ("Ctrl") keyboard button. Further, to exclude as a region for the given listing, the posting user performs a second type of user different from the first type. For example, as shown in FIG. 10B, to exclude Kansas at the region level, the posting user mouse-clicks on Kansas while holding down the "Shift" keyboard button. Further, if the posting user wishes to include a given region in the included variable locations 1015, user alternative clicks (e.g., right mouse button click, shift clicks) on the region and enters a discount rate into a pop-up window for that region (see FIG. 11). In some example embodiments, mouse clicking on a given region without the accompanying keyboard buttons (e.g., without pressing "ctrl") zooms the item user interface subregion level as discussed in further detail below. Additionally, the posting user can select zoom buttons 1003 to toggle region and sub-region selection levels.

Figure 11:
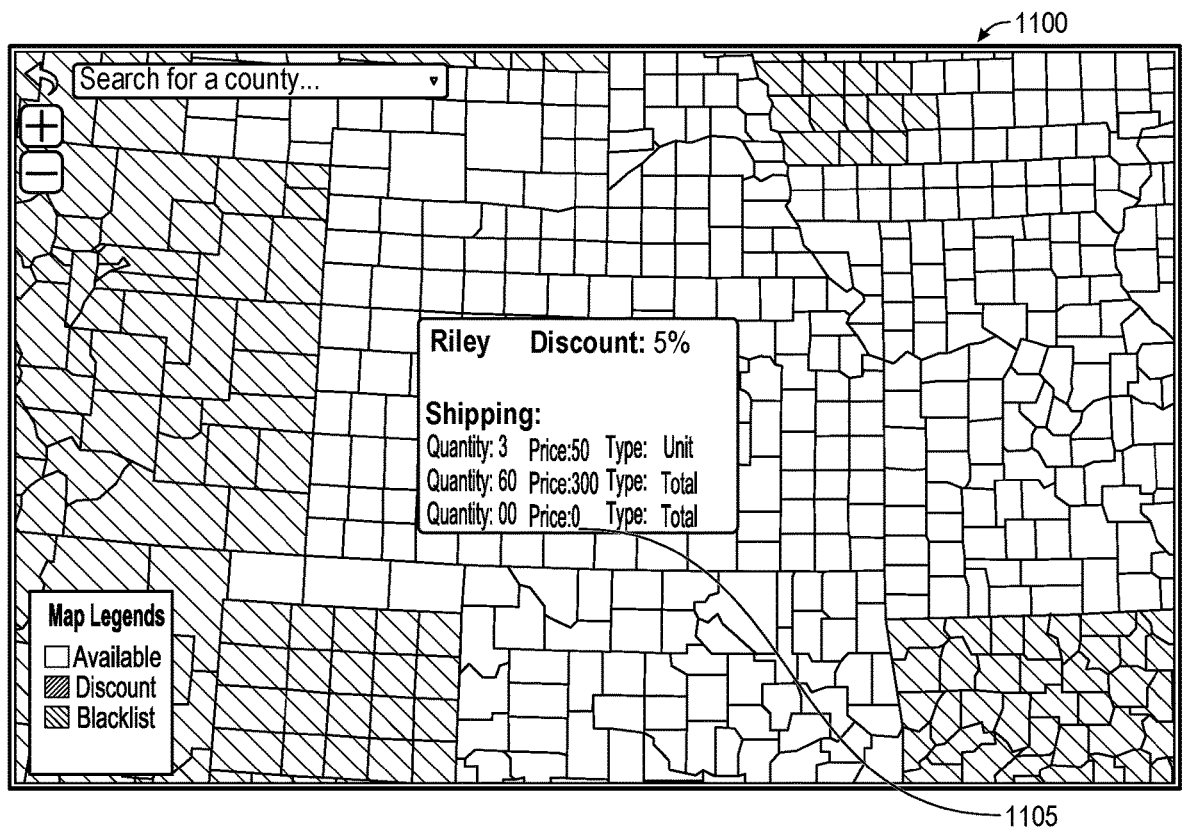
FIG. 11 shows the subregion map item user interface at the subregion level, according to some example embodiments.

FIG. 11 shows a map item user interface 1100 at the subregion level, according to some example embodiments. The map item user interface 1100 can be displayed in response to a posting user clicking on given region. For example, with reference to FIG. 10B, assume the posting user control clicks on Kansas to include the region, then clicks on Kansas without the control or shift buttons to initiate the map item user interface 1100 of FIG. 11. In the map item user interface 1100, the posting user can include, exclude, or include at a discount rate different subregions for a given item listing. For example, to include Riley County, Kans., the posting user control clicks on Riley County in the map item user interface 1100. Responsive to the control click, a pop-up window 1105 is displayed that allows the posting user to edit static costs such as shipping and dynamic data such as discounts for that specific county (which may rapidly change due to manufacturer pricing differently per county).

Figure 12:
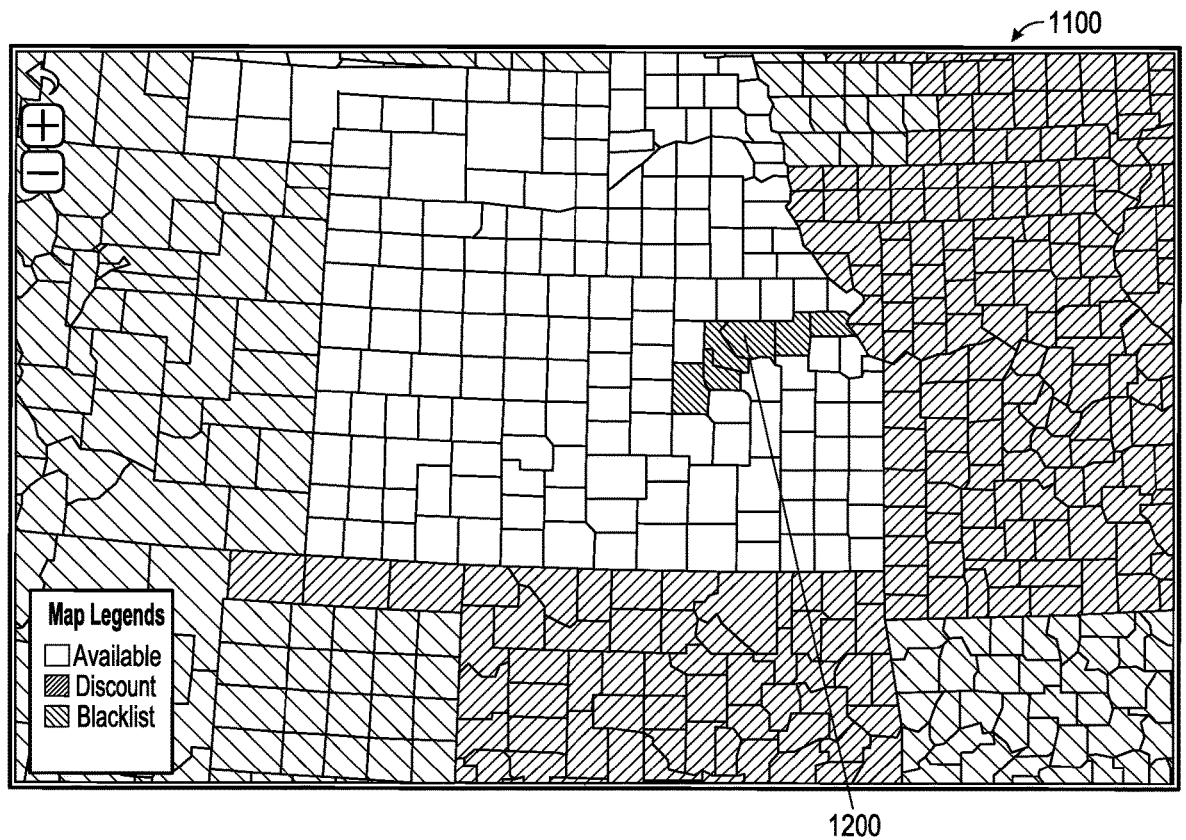
FIG. 12 shows another type of subregion selection, according to some example embodiments.

FIG. 12 shows another type of subregion selection, according to some example embodiments. In the example of FIG. 12, the posting user in the map item user interface level 1100 shift clicks a row of counties in Kansas to exclude (e.g., blacklist) them based on the posting user's knowledge that his/her seed grow poorly in soggy ground and those counties have soggy ground due to a recent storm.

Figure 13:
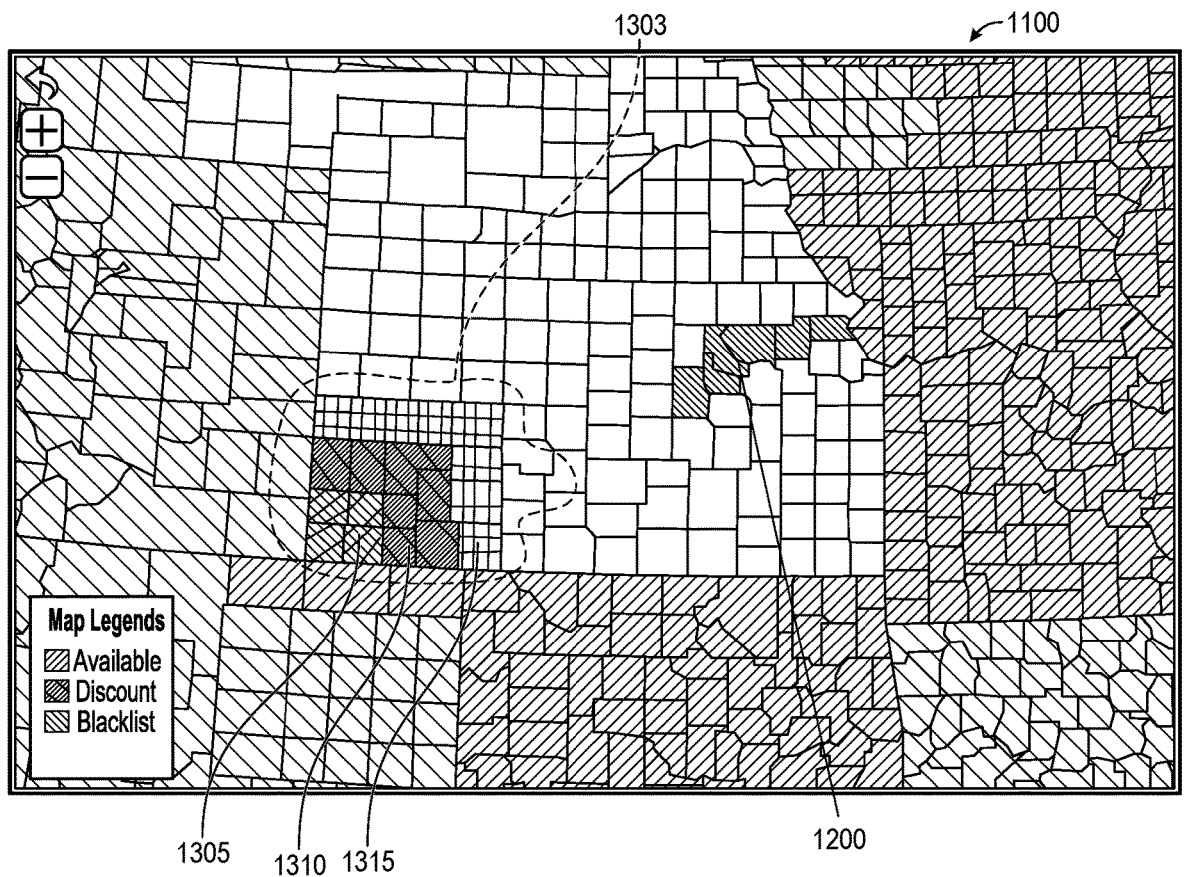
FIG. 13 shows subregion map item user interface for including locations in the included variable discounted locations, according to some example embodiments.

FIG. 13 shows the map item user interface 1100 for including locations in the included variable discounted locations 1015, according to some example embodiments. In FIG. 13, the posting user is viewing a region at the subregion (e.g., county) level, and can alternative click multiple counties to assign the counties different discount rates for the seed item listing being posted. For example, the posting users knows that the south west corner of Kansas a certain type of insect is prevalent in the ground soil. The posting user then includes multiple sub-region counties in included variable discounted locations 1303 by alternative clicking on each and inputting a discount rate. The rate can vary from 0 to 100%. Further, the hue or intensity of the different color used to indicate the included variable discounted counties can vary per the discount level. In the example of FIG. 3, the variable discounts are indicated via different cross-hatch line patterns. In the illustrated example, the posting user discounts four counties at a first level 1305 (e.g., 50%, where those four counties are shown on the display screen in intense blue color), discounts seven counties at a second level 1310 (e.g., 25%, where those seven counties are shown on the display screen in lighter blue color), and discounts nine counties a third level 1315 (e.g., 3%, where those nine counties are shown on the display screen in light blue or near white color). The posting user then rapidly ascertain how his seed will be displayed to search users that search from the different counties in the region (e.g., Kansas). Upon the posting user entering the item listing data, the user selects post button 815 to generate a webpage listing for the item, and further generate and store data structure 630 and 650, as discussed above.

FIG. 14 shows a browsing user interface 1400, according to some example embodiments. In the illustrative example, a searching user, such as a farm in Riley, Kans. is navigating the seed network site for seeds that function in his/her plot of land. The browsing user interface 1400 is advantageous in that the searching user experiences the browsing user interface as merely navigating through a site, when instead the site is creating a geo-based seed search query and only showing those complex posting user generated results that are tailored to the searching user's geographic location per data structure 630, discussed above. In FIG. 14, the searching user inputs a location of the land in location input 1405 and selects a seed or plant type in plant input 1410. Upon inputting the information, a geo-query is automatically generated, and search results 1420A-D are displayed in results window 1415. In some example embodiments, each of the results 1420A-D is an item listing generated using the methods 300-600 and data structures 630 and 650. Each of the listings is included in the results window 1415 based on the specific geographic data input by each of the posting users (that created the respective results 1420A-D) being congruent with the location input into 1405. In this way, the site passively funnels users into certain search results, each of which may generated by another user (e.g., posting users), while simplifying which data is shown to searching user (e.g., a farmer). Further, the searching user can modify the dynamic control sliders 1425 based on the searching user's knowledge about his/her land in Riley County. In response to the dynamic control sliders 1425 being adjusted, the data in the results window 1515 is automatically adjusted based on the new variable values set by the sliders 1425 and the geographic data per the listing that is specified by the searching users that generated the given listing.

Figure 15:
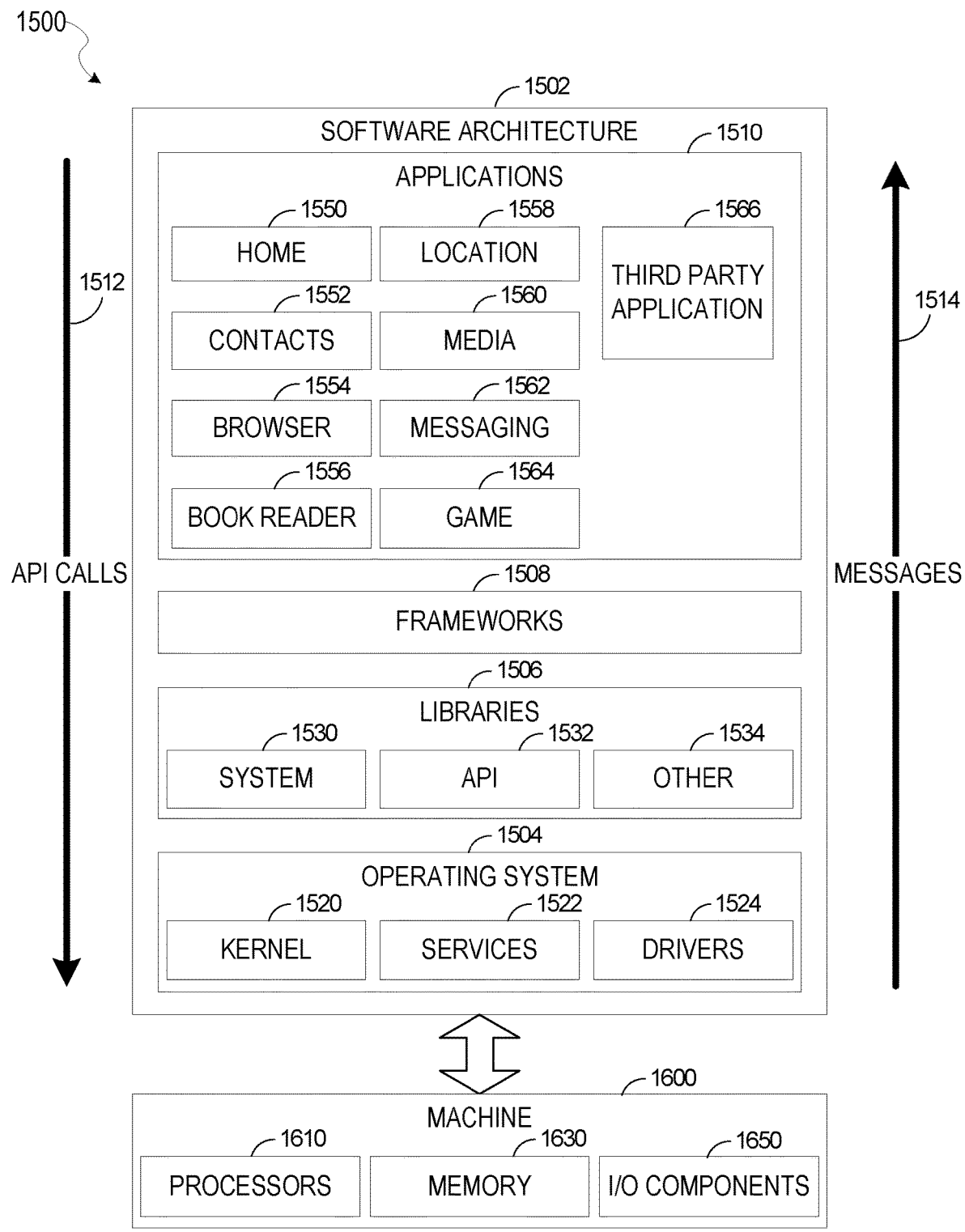
FIG. 15 is a block diagram illustrating architecture of software used to implement the listing system, according to some example embodiments.

FIG. 15 is a block diagram 1500 illustrating an architecture of software 1502, which can be installed on any one or more of the devices described above. FIG. 15 is merely a non-limiting example of a software architecture, and it will be appreciated that many other architectures can be implemented to facilitate the functionality described herein. In various embodiments, the software 1502 is implemented by hardware such as a machine 1600 of FIG. 16 that includes processors 1610, memory 1630, and I/O components 1650. In this example architecture, the software 1502 can be conceptualized as a stack of layers where each layer may provide a particular functionality. For example, the software 1502 includes layers such as an operating system 1504, libraries 1506, frameworks 1508, and applications 1510. Operationally, the applications 1510 invoke application programming interface (API) calls 1512 through the software stack and receive messages 1514 in response to the API calls 1512, consistent with some embodiments.

In various implementations, the operating system 1504 manages hardware resources and provides common services. The operating system 1504 includes, for example, a kernel 1520, services 1522, and drivers 1524. The kernel 1520 acts as an abstraction layer between the hardware and the other software layers, consistent with some embodiments. For example, the kernel 1520 provides memory management, processor management (e.g., scheduling), component management, networking, and security settings, among other functionality. The services 1522 can provide other common services for the other software layers. The drivers 1524 are responsible for controlling or interfacing with the underlying hardware, according to some embodiments. For instance, the drivers 1524 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1506 provide a low-level common infrastructure utilized by the applications

1510. The libraries 1506 can include system libraries 1530 (e.g., C standard library) that can provide functions such as memory allocation functions, string manipulation functions, mathematic functions, and the like. In addition, the libraries 1506 can include API libraries 1532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1506 can also include a wide variety of other libraries 1534 to provide many other APIs to the applications 1510.

The frameworks 1508 provide a high-level common infrastructure that can be utilized by the applications 1510, according to some embodiments. For example, the frameworks 1508 provide various graphic user interface (GUI) functions, high-level resource management, high-level location services, and so forth. The frameworks 1508 can provide a broad spectrum of other APIs that can be utilized by the applications 1510, some of which may be specific to a particular operating system or platform.

In an example embodiment, the applications 1510 include a home application 1550, a contacts application 1552, a browser application 1554, a book reader application 1556, a location application 1558, a media application 1560, a messaging application 1562, a game application 1564, and a broad assortment of other applications such as a third-party application 1566. According to some embodiments, the applications 1510 are programs that execute functions defined in the programs. Various programming languages can be employed to create one or more of the applications 1510, structured in a variety of manners, such as object-oriented programming languages (e.g., Objective-C, Java, or C++) or procedural programming languages (e.g., C or assembly language). In a specific example, the third-party application 1566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1566 can invoke the API calls 1512 provided by the operating system 1504 to facilitate functionality described herein.

Figure 16:
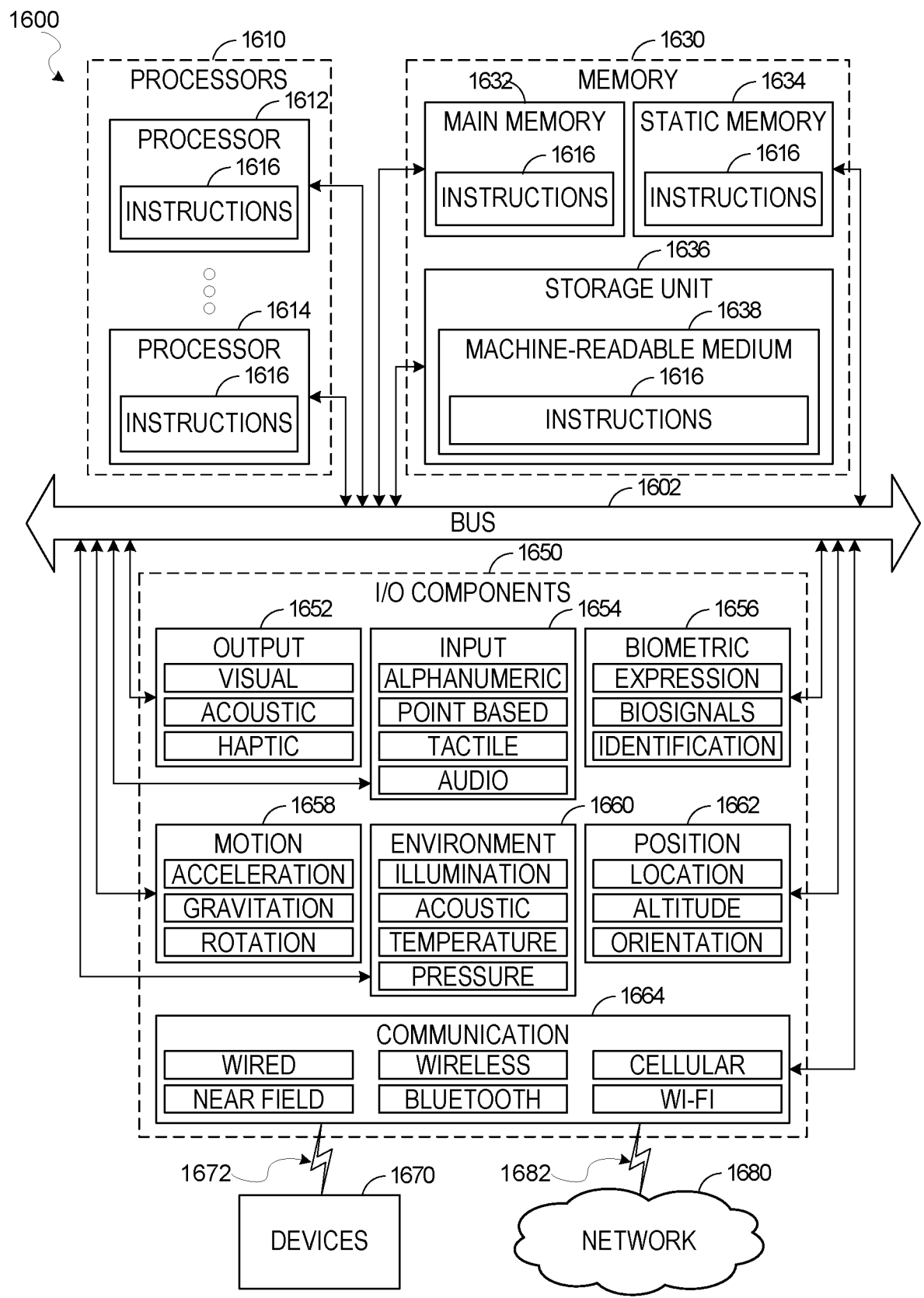
FIG. 16 shows a machine as an example computer system with instructions to cause the machine to implement the listing system, according to some example embodiments.

FIG. 16 illustrates a diagrammatic representation of a machine 1600 in the form of a computer system within which a set of instructions may be executed for causing the machine to perform any one or more of the methodologies discussed herein, according to an example embodiment. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. The instructions 1616 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory 1630, and I/O components 1650, which may be configured to communicate with each other such as via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1612 and a processor 1614 that may execute the instructions 1616. The term "processor" is intended to include multi-core processors that may comprise two or more independent processors (sometimes referred to as "cores") that may execute instructions contemporaneously. Although FIG. 16 shows multiple processors 1610, the machine 1600 may include a single processor with a single core, a single processor with multiple cores (e.g., a multi-core processor), multiple processors with a single core, multiple processors with multiples cores, or any combination thereof.

The memory 1630 may include a main memory 1632, a static memory 1634, and a storage unit 1636, both accessible to the processors 1610 such as via the bus 1602. The main memory 1630, the static memory 1634, and storage unit 1636 store the instructions 1616 embodying any one or more of the methodologies or functions described herein. The instructions 1616 may also reside, completely or partially, within the main memory 1632, within the static memory 1634, within the storage unit 1636, within at least one of the processors 1610 (e.g., within the processor's cache memory), or any suitable combination thereof, during execution thereof by the machine 1600.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environmental components 1660, or position components 1662, among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1658 may include acceleration sensor components (e.g., accelerometer), gravitation sensor components, rotation sensor components (e.g., gyroscope), and so forth. The environmental components 1660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1662 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via a coupling 1682 and a coupling 1672, respectively. For example, the communication components 1664 may include a network interface component or another suitable device to interface with the network 1680. In further examples, the communication components 1664 may include wired communication components, wireless communication components, cellular communication components, Near Field Communication (NFC) components, Bluetooth® components (e.g., Bluetooth®Low Energy), Wi-Fi® components, and other communication components to provide communication via other modalities. The devices 1670 may be another machine or any of a wide variety of peripheral devices (e.g., a peripheral device coupled via a USB).

Moreover, the communication components 1664 may detect identifiers or include components operable to detect identifiers. For example, the communication components 1664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1664, such as location via Internet Protocol (IP) geolocation, location via Wi-Fi® signal triangulation, location via detecting an NFC beacon signal that may indicate a particular location, and so forth.

The various memories (i.e., 1630, 1632, 1634, and/or memory of the processor(s) 1610) and/or storage unit 1636 may store one or more sets of instructions and data structures (e.g., software) embodying or utilized by any one or more of the methodologies or functions described. herein. These instructions (e.g., the instructions 1616), when executed by processor(s) 1610, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated. data signals, and other such media, at least some of which are covered under the term "signal medium" discussed below.

In various example embodiments, one or more portions of the network 1680 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1680 or a portion of the network 1680 may include a wireless or cellular network, and the coupling 1682 may be a Code Division Multiple Access (CDMA) connection, a Global System for Mobile communications (GSM) connection, or another type of cellular or wireless coupling. In this example, the coupling 1682 may implement any of a variety of types of data transfer technology, such as Single Carrier Radio Transmission Technology (1× RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., hypertext transfer protocol (HTTP)). Similarly, the instructions 1616 may be transmitted or received using a transmission medium via the coupling 1672 (e.g., a peer-to-peer coupling) to the devices 1670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1616 for execution by the machine 1600, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method comprising:
   providing a user interface (UI) for configuring seed item listings in a seed item listing database, the UI presenting a seed post map with a plurality of regions, each region comprising one or more subregions inside the region, the UI presenting each subregion with a first color indicating that a seed item listing is available for purchase without a discount rate by an end-user in the subregion, a second color indicating that the seed item is available for purchase with a discount rate by the end-user in the subregion, and a third color indicating that the seed item is unavailable for purchase by the end-user in the subregion, the UI providing:
      a first option for selecting a region or a subregion as available in response to receiving a first input type entered with a computer mouse, the UI changing a format of the region or subregion in response to detecting the first input type,
      a second option for selecting a region or a sub-region as unavailable in response to receiving a second input type entered with the computer mouse, the UI changing the format of the region or subregion in response to detecting the second input type, the UI enabling configuring the regions and sub-regions to be available or unavailable without opening additional windows, and
      a third option for selecting a region or sub-region to configure a discount rate for the selected region or sub-region in response to receiving a third input type entered with the computer mouse, the UI causing presentation of a pop-up window for entering the discount rate and shipping cost for the region or subregion in response to receiving the third input type, each seed item listing in the seed item listings database being configurable to be available, available with the discount rate, or unavailable for each region and sub-region;
   receiving, from a network site end-user, a seed item search request specifying a geographic location;
   accessing the seed item listing database;
   determining, using one or more processors of a machine, which seed item listings are available for purchase in the geographic location based on each seed item being available without a discount rate and based on each seed item being available with the discount rate in the regions and sub-regions of the geographic location; and
   causing, on a user device of the network site end-user, a presentation displaying the seed item listings that are available for purchase in the geographic location.

2. The method of claim 1, wherein the UI displays the regions in a region-level user interface in which only regions are selectable for inclusion as a network site search result, and a sub-region-level user interface sub-regions are selectable for inclusion as a network site search result.

3. The method of claim 2, wherein the regions are selectable in the UI using a first user input interaction and the sub-regions are selectable using a second user input interaction that is different than the first user input interaction.

4. The method of claim 1, wherein the UI displays a map of a country, and the regions are states and the sub-regions are state counties.

5. The method of claim 1, wherein each of the sub-regions in the UI is editable to include a discount rate for that sub-region.

6. The method of claim 1, wherein the UI further provides:
   a fourth option for configuring variable seed growing parameters of the seed item listings, the variable seed growing parameters comprising parameters with values on a range, wherein the presentation displays the seed item listings that are available for purchase and a plurality of variable user selection elements that are selectable to filter the search item results based on the variable seed growing parameters.

7. The method of claim 6, further comprising:
   receiving, from the network site end-user, modification of the plurality of variable user selection elements; and
   in response to the modification, dynamically updating the seed item listings that are available for purchase to match the variable seed growing parameters and the geographic location.

8. The method of claim 1, wherein the UI further provides:
   a fifth option for entering static data for the seed item listing.

9. The method of claim 1, wherein the presentation further includes a discounted price based on the region or sub-region of the geographic location.

10. A system comprising:
one or more processors of a machine; and
a memory storing instructions that, when executed by the one or more processors, cause the machine to perform operations comprising:
providing a user interface (UI) for configuring seed item listings in a seed item listing database, the UI presenting a seed post map with a plurality of regions, each region comprising one or more subregions inside the region, the UI presenting each subregion with a first color indicating that a seed item listing is available for purchase without a discount rate by an end-user in the subregion, a second color indicating that the seed item is available for purchase with a discount rate by the end-user in the subregion, and a third color indicating that the seed item is unavailable for purchase by the end-user in the subregion, the UI providing:
a first option for selecting a region or a subregion as available in response to receiving a first input type entered with a computer mouse, the UI changing a format of the region or subregion in response to detecting the first input type,
a second option for selecting a region or a sub-region as unavailable in response to receiving a second input type entered with the computer mouse, the UI changing the format of the region or subregion in response to detecting the second input type, the UI enabling configuring the regions and sub-regions to be available or unavailable without opening additional windows, and
a third option for selecting a region or sub-region to configure a discount rate for the selected region or sub-region in response to receiving a third input type entered with the computer mouse, the UI causing presentation of a pop-up window for entering the discount rate and shipping cost for the region or subregion in response to receiving the third input type, each seed item listing in the seed item listings database being configurable to be available, available with the discount rate, or unavailable for each region and sub-region;
receiving, from a network site end-user, a seed item search request specifying a geographic location;
accessing the seed item listing database;
determining which seed item listings are available for purchase in the geographic location based on each seed item being available without a discount rate and based on each seed item being available with the discount rate in the regions and sub-regions of the geographic location; and
causing, on a user device of the network site end-user, a presentation displaying the seed item listings that are available for purchase in the geographic location.

11. The system of claim 10, wherein the UI displays the regions in a region-level user interface in which only regions are selectable for inclusion as a network site search result, and a sub-region-level user interface sub-regions are selectable for inclusion as a network site search result.

12. The system of claim 11, wherein the regions are selectable in the UI using a first user input interaction and the sub-regions are selectable using a second user input interaction that is different than the first user input interaction.

13. The system of claim 10, wherein the UI displays a map of a country, and the regions are states and the sub-regions are state counties.

14. The system of claim 10, wherein each of the sub-regions in the UI is editable to include a discount rate for that sub-region.

15. The system of claim 10, wherein the UI further provides:
a fourth option for configuring variable seed growing parameters of the seed item listings, the variable seed growing parameters comprising parameters with values on a range, wherein the presentation displays the seed item listings that are available for purchase and a plurality of variable user selection elements that are selectable to filter the search item results based on the variable seed growing parameters.

16. The system of claim 15, the operations further comprising:
receiving, from the network site end-user, modification of the plurality of variable user selection elements; and
in response to the modification, dynamically updating the seed item listings that are available for purchase to match the variable seed growing parameters and the geographic location.

17. A machine-readable storage device embodying instructions that, when executed by a machine, cause the machine to perform operations comprising:
providing a user interface (UI) for configuring seed item listings in a seed item listing database, the UI presenting a seed post map with a plurality of regions, each region comprising one or more subregions inside the region, the UI presenting each subregion with a first color indicating that a seed item listing is available for purchase without a discount rate by an end-user in the subregion, a second color indicating that the seed item is available for purchase with a discount rate by the end-user in the subregion, and a third color indicating that the seed item is unavailable for purchase by the end-user in the subregion, the UI providing:
a first option for selecting a region or a subregion as available in response to receiving a first input type entered with a computer mouse, the UI changing a format of the region or subregion in response to detecting the first input type,
a second option for selecting a region or a sub-region as unavailable in response to receiving a second input type entered with the computer mouse, the UI changing the format of the region or subregion in response to detecting the second input type, the UI enabling configuring the regions and sub-regions to be available or unavailable without opening additional windows, and
a third option for selecting a region or sub-region to configure a discount rate for the selected region or sub-region in response to receiving a third input type entered with the computer mouse, the UI causing presentation of a pop-up window for entering the discount rate and shipping cost for the region or subregion in response to receiving the third input type, each seed item listing in the seed item listings database being configurable to be available, available with the discount rate, or unavailable for each region and sub-region;
receiving, from a network site end-user, a seed item search request specifying a geographic location;
accessing the seed item listing database;
determining which seed item listings are available for purchase in the geographic location based on each seed item being available without a discount rate and based on each seed item being available with the discount rate in the regions and sub-regions of the geographic location; and causing, on a user device of the network site end-user, a presentation displaying the seed item listings that are available for purchase in the geographic location.

18. The machine-readable storage device of claim 17, wherein the UI displays the regions in a region-level user interface in which only regions are selectable for inclusion as a network site search result, and a sub-region-level user interface sub-regions are selectable for inclusion as a network site search result.

19. The machine-readable storage device of claim 18, wherein the regions are selectable in the UI using a first user input interaction and the sub-regions are selectable using a second user input interaction that is different than the first user input interaction.

20. The machine-readable storage device of claim 17, wherein each of the sub-regions in the UI is editable to include a discount rate for that sub-region.

* * * * *